United States Patent [19]

Holzhauser et al.

[11] Patent Number: 4,470,695

[45] Date of Patent: Sep. 11, 1984

[54] AUXILIARY PLATEN COVER

[75] Inventors: Ronald C. Holzhauser, Holley; Richard O'Marra, Churchville; Glenn Seymour, Hemlock, all of N.Y.

[73] Assignee: Eastman Kodak Company, Rochester, N.Y.

[21] Appl. No.: 449,817

[22] Filed: Dec. 15, 1982

[51] Int. Cl.³ ............................................ G03B 27/62
[52] U.S. Cl. ...................................... 355/75; 355/3 R
[58] Field of Search ................. 355/75, 76, 67, 118, 355/23, 25, 3 R, 11; 101/118; 160/185; 220/333; 271/109, 171; 312/303

[56] References Cited

U.S. PATENT DOCUMENTS

| 207,214 | 8/1878 | Sheldon | 217/81 |
| 623,385 | 4/1899 | Sprinkel | 160/185 |
| 894,154 | 7/1908 | Kaiser | 355/67 |
| 1,431,288 | 10/1922 | Corder | 220/333 |
| 2,197,036 | 4/1940 | Ford | 101/32 |
| 2,198,251 | 4/1940 | Jackson | 355/118 |
| 2,233,895 | 3/1941 | Mestre | 101/118 |
| 3,300,265 | 1/1967 | Wilmer et al. | 312/303 |
| 3,339,916 | 9/1967 | Tregay | 271/36 |
| 3,416,835 | 12/1968 | Ohle | 296/100 |
| 3,630,620 | 7/1969 | Fackler | 355/76 |
| 3,726,589 | 4/1973 | DiFulvio et al. | 355/75 X |
| 3,998,541 | 12/1976 | Michaloski | 355/11 |
| 4,150,896 | 4/1979 | Wakeman | 355/75 |
| 4,157,222 | 6/1979 | Ishihara | 355/75 |
| 4,176,945 | 12/1979 | Holzhauser et al. | 355/23 |
| 4,245,831 | 1/1981 | Michatek | 271/171 |

OTHER PUBLICATIONS

One page from Kodak Brochure relating to 250 Ektaprint Duplicator.
Research Disclosure No. 18540, Sep., 1979.
Research Disclosure No. 18106, May, 1979.

Primary Examiner—Richard A. Wintercorn
Attorney, Agent, or Firm—G. Herman Childress

[57] ABSTRACT

In copier/duplicators lamps provide high intensity illumination of a document at an exposure station, and an image of the illuminated document is processed and transferred to a copy sheet. The copier/duplicator can have a combination recirculating document feeder and document positioner located at a first position over the exposure station for delivery to the station of a document sheet to be copied. The feeder can be mounted for movement to a second position spaced from the exposure station so that books or other documents can be manually placed directly on the exposure station. When the feeder is in its second position it is desirable to shield the machine operator from such high intensity illumination. For this purpose, an auxiliary cover is movable between a storage position adjacent the exposure station and a second position over the exposure station. Sheet guide members on the auxiliary cover are located relative to the document positioner so that when the positioner is in its position over the exposure station and the cover is in its storage position adjacent the exposure station the guide members are effective to guide a sheet into the document positioner.

7 Claims, 7 Drawing Figures

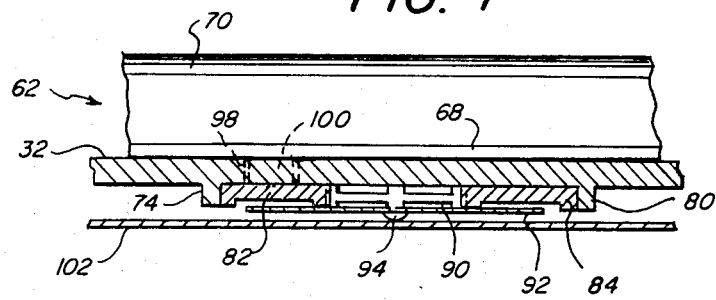
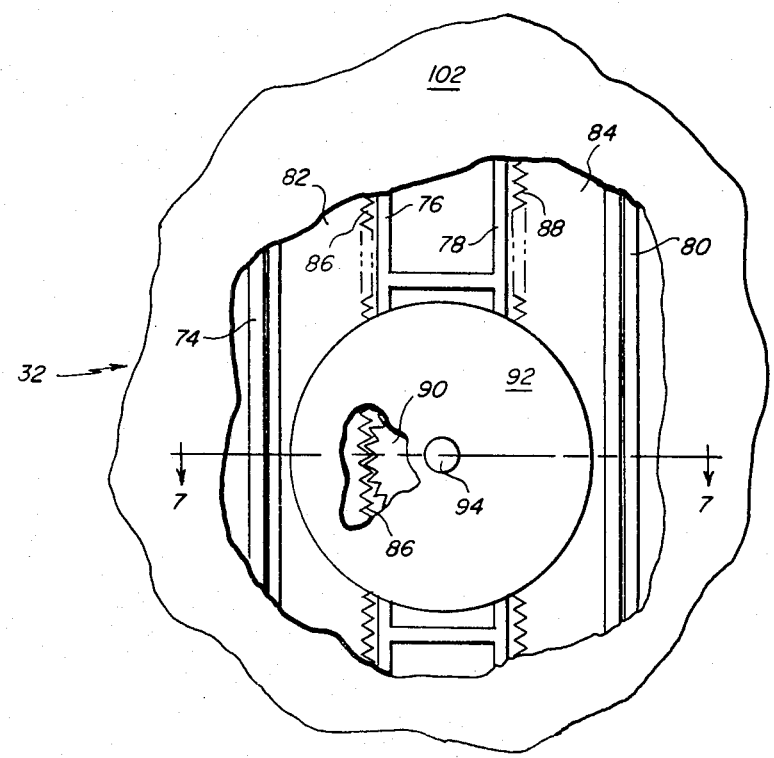

AUXILIARY PLATEN COVER

CROSS REFERENCE TO RELATED APPLICATION

Reference is made to the co-pending, commonly assigned U.S. patent application Ser. No. 427,237, entitled APPARATUS FOR MOUNTING A DOCUMENT FEEDER ON A COPIER/DUPLICATOR filed on Sept. 29, 1982 in the names of R. C. Holzhauser et al.

BACKGROUND OF THE INVENTION

It is well known in modern copier/duplicators that operate on an electrographic process to locate a document at an exposure station and illuminate the document with a relatively high intensity lamp to thereby form a latent image of the document on a charged photoconductor. The image is then developed, transferred to a copy sheet and fused to that sheet. Some such copier/duplicators hold the document sheet stationary on a platen at the exposure station and illuminate the document by flashing one or more high intensity flash lamps. By using flash lamps capable of providing a high intensity, short duration pulse of illumination, a good latent image can be obtained even though the photoconductor is moving and the document is stationary at the time the lamps are flashed. In order to increase the copying rate, it is necessary for the photoconductor to be moved at a faster speed. Increasing the speed of movement of the photoconductor may result in blurred images on the photoconductor unless there are other changes in the process. One way to avoid blurring of the images is to reduce the time interval during which the flash lamps are illuminated, and this requires a lamp capable of producing a high intensity flash. The flash from high intensity lamps may annoy a machine operator when a document is placed directly on the platen without a platen cover being positioned over the document to shield the operator from the illumination produced by a high intensity flash. In addition, the use of a cover may be necessary in some countries in order to comply with governmental regulations. Thus the problems associated with high intensity illumination make it desirable to provide an auxiliary platen cover.

The use of simple hinged platen covers has been known for many years. It also is known to provide a foldable cover that is hinged at the rear edge of the platen and moveable from a folded position adjacent the platen to an extended position over the platen for covering a document located over the platen. Such a foldable platen cover is disclosed in U.S. Pat. Nos. 3,630,620 and 2,198,251.

Platen covers have not been used when the copier/duplicator is provided with a document feeder for automatically delivering documents to the platen or exposure station. Platen covers are not used with feeders because the document feeder typically overlies the platen or exposure station during operation of the feeder and therefore provides the desireable light shield. However, even the presence of such a document feeder on a copier does not entirely solve the problem because such feeders commonly are hinged for movement from an operating position overlying the platen to an elevated position spaced from the platen so that books or other documents can be placed directly on the platen for copying. For example, the before-mentioned copending U.S. patent application Ser. No. 427,237 discloses the mounting of such a feeder along the left side edge of a platen. When the feeder is in its elevated position, the operator can be exposed to high intensity flash lamps in the copier/duplicator and may experience some annoyance or discomfort. For a thin document, such as a sheet of paper, the feeder can be lowered over the document and thus function as a cover. However, for thick documents, such as a book, the feeder may not be effective to protect the operator completely from high intensity illumination.

Various types of document feeders also are known. In some instances, the document feeders comprise recirculating feeders in which document sheets of a set are fed seriatim from a supply to the platen for copying once and then returned to the supply. The set of document sheets is recirculated one or more times in order to obtain one or more sets of copies. In other instances, semi-automatic document handlers or feeders receive a single document sheet manually fed by an operator and deliver such sheet to the platen for copying one or more times. Then the operator delivers a second sheet for copying one or more times. If the various document sheets are related, the resulting copies must be collated manually or directed into separate collator apparatus. Such semi-automatic document handlers are referred to herein as document positioners.

It also is known to provide a combination recirculating document feeder and document positioner. In this regard, reference is made to the commonly assigned U.S. Pat. No. 4,176,945 entitled SHEET FEEDING APPARATUS FOR USE WITH COPIER/DUPLICATORS OR THE LIKE, which issued on Dec. 4, 1979 in the names of R. C. Holzhauser, C. H. Zirngibl and V. J. O'Brien. The present invention is especially useful in connection with a combination recirculating feeder, document positioner, as generally disclosed in such U.S. Pat. No. 4,176,945, and with the beforementioned document positioner type feeder.

Sheet guide members have been provided for registering a sheet before manually advancing the sheet into a document positioner. For example, the Kodak Ektaprint 250 Duplicator, manufactured by the assignee of the present application, has two such sheet guide members on the upper surface thereof adjacent to the inlet to the document positioner. The guide members of the Ektaprint duplicator are adjustable relative to each other by an operator grasping one of the guide members and moving it toward or away from the other guide member. Sheet guide members for feeding document sheets in duplicator apparatus or the like also are disclosed in commonly assigned U.S. Pat. No. 4,245,831 which issued on Jan. 20, 1981 in the name of S. F. Michatek, and in U.S. Pat. Nos. 2,197,036 which issued on Apr. 16, 1940 in the name of F. R. Ford, 2,233,895 which issued on Mar. 4, 1941 in the name of L. Mestre, and 3,339,916 which issued on Sept. 5, 1967 in the name of J. L. Tregay.

Thus the art generally has recognized the problems associated with high intensity flash illumination of documents at an exposure station. However, the usual solution of providing a cover for the exposure station, while adequate in some instances, does not solve the problem when document feeders normally cover the exposure station but are lifted for copying of individual document sheets, books or the like. In the latter instance the document feeder typically takes up a substantial amount of room and frequently is mounted at the rear on the platen in such a way that little or no room is available for a cover when the feeder is raised for copying individual documents.

SUMMARY OF THE INVENTION

The present invention is useful with a copier/duplicator having an exposure station and a document feeder mounted for movement between a first position over the exposure station for delivery to the station of a document sheet to be copied, and a second position spaced from the exposure station so that books or other documents can be manually placed on the exposure station. The present invention relates to an auxiliary cover for the exposure station. Means are provided for mounting the cover for movement between a first position adjacent to the exposure station and the feeder when the feeder is in its first position, and a second position over the exposure station when the feeder is in its second position. Sheet guide means are mounted on the cover and are located relative to the feeder when the feeder and cover are in their respective first positions to locate sheets for delivery to the feeder.

BRIEF DESCRIPTION OF THE DRAWINGS

In the detailed description of the preferred embodiment of the invention presented below reference is made to the accompanying drawings, in which:

FIG. 6 is an enlarged fragmentary view of the bottom of the cover with portions broken away to illustrate the mechanism for adjusting sheet guides on the top side of the cover; and FIG. 7 is a fragmentary cross-section view taken along line 7—7 in FIG. 6.

DETAILED DESCRIPTION OF THE PREFERRED EMBODIMENT

Figure 1:
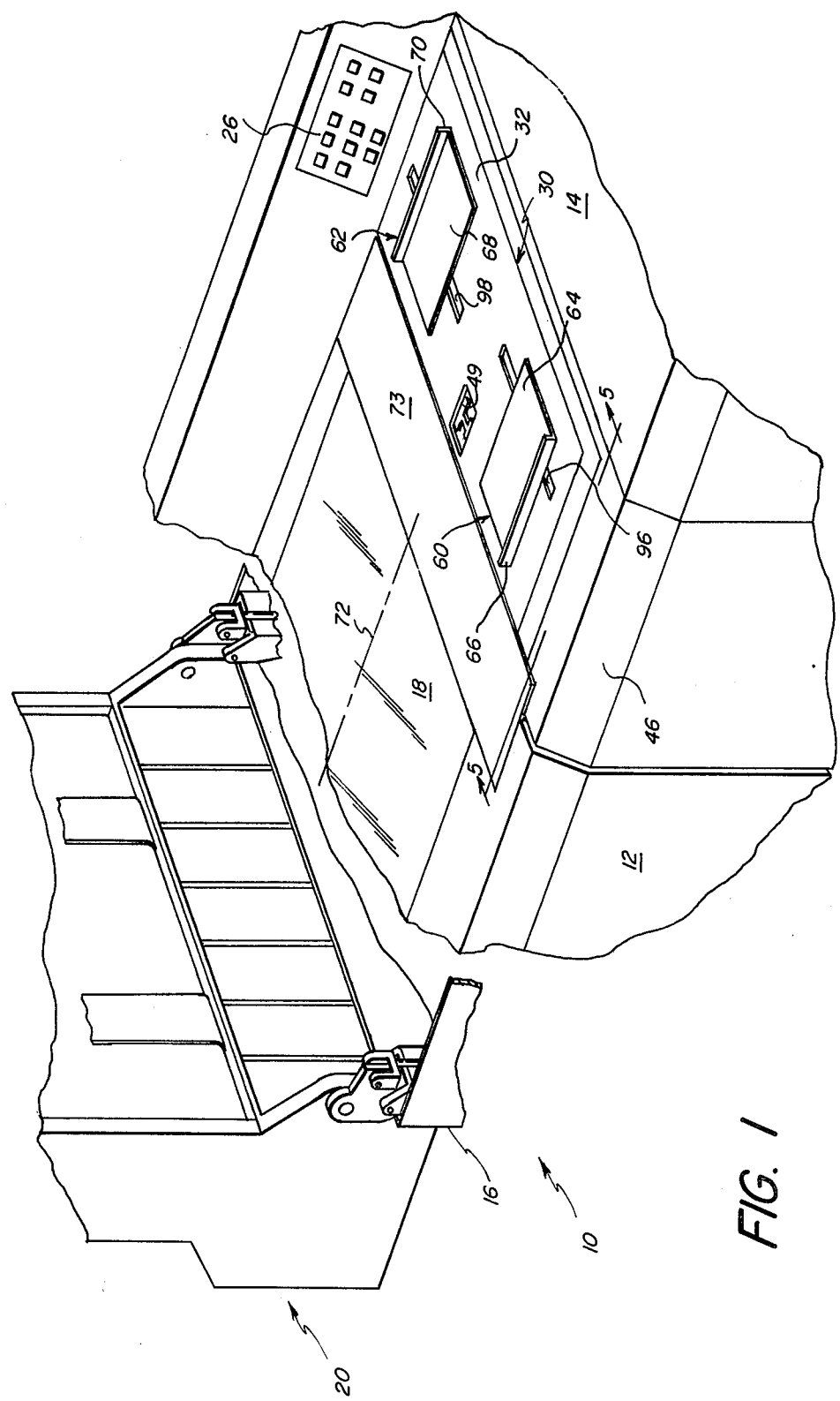
FIG. 1 is a fragmentary perspective view showing portions of the top and front of a copier/duplicator incorporating the auxiliary platen cover of the present invention and showing a document feeder in its raised position.
Figure 2:
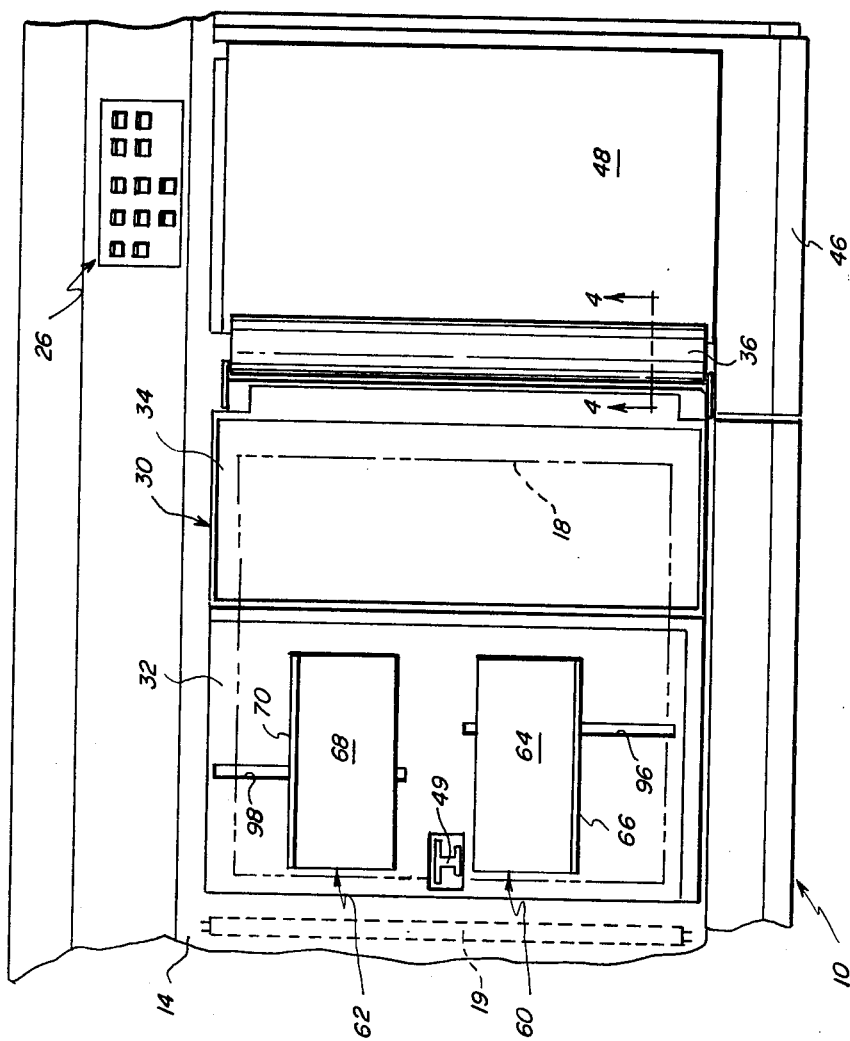
FIG. 2 is a fragmentary plan view of the copier/duplicator illustrated in FIG. 1 and showing the auxiliary cover in a position over the exposure station.

Referring now to FIGS. 1 and 2, a copier/duplicator generally designated 10 has a front wall 12, a top 14 and a left end 16. A rectangular platen 18 near the left end of the top wall 14 defines an exposure station for the copier/duplicator. Documents to be copied are placed face down on the platen and illuminated by a plurality of flash lamps, one of which is shown at 19 in FIG. 2. Commonly assigned U.S. Pat. No. 3,998,541, issued on Dec. 21, 1976 in the name of A. J. Michaloski discloses one example of an illumination system having two flash lamps located inside a copier housing and to the side of the area immediately below the platen.

A combination recirculating document feeder/document positioner 20 is mounted for pivotal movement about the left end portion of the copier/duplicator, as described in detail in the beforementioned copending U.S. patent application Ser. No. 427,237. FIG. 1 illustrates the feeder in a raised position spaced from the platen 18 so that books or other documents can be manually placed directly on the platen for copying. The feeder can also be swung about an axis generally parallel to the left end 16 of the feeder from its raised position (FIG. 1) to a lowered position (FIG. 5) wherein the feeder is located directly over the platen and is effective to feed sheets directly to the platen. When the feeder is in its lowered position, suitable drive means, such as sets of drive rollers 22 and 24 (FIG. 5), can receive a document sheet fed into a slot between the lower edge of the feeder and the top wall 14 of the copier for driving a sheet onto the platen 18 for copying one or more times. This portion of the feeder 20 comprises a document positioner and is described in more detail in the beforementioned U.S. Pat. No. 4,176,945. The copier/duplicator also includes an operator control panel 26 that is used by the machine operator to indicate the number of copies desired and other information required for operation of the copier.

Figure 4:
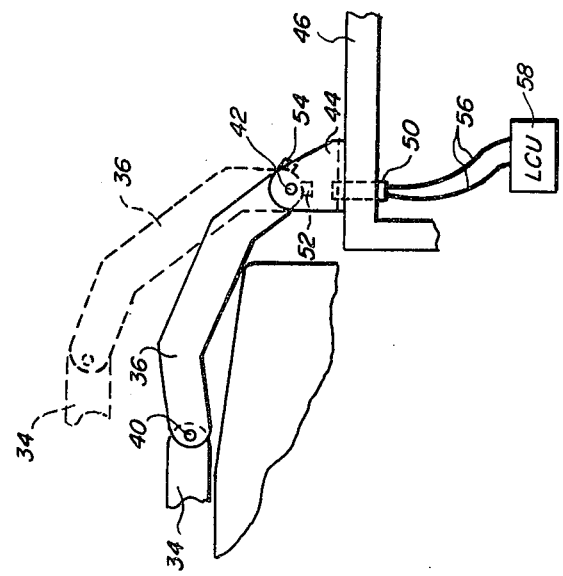
FIG. 4 is a detailed section view taken along line 4—4 of FIG. 2 and illustrating apparatus for sensing the position of the cover.

In accordance with the present invention the copier/duplicator 10 is provided with an auxiliary cover generally designated 30 which is adapted to be positioned over the platen 18 or other exposure station when feeder 20 is in its raised position. Cover 30 comprises three sections 32, 34 and 36. Sections 32 and 34 are secured together by a continuous hinge 38 (FIGS. 3 and 5) that is attached to one side edge of each of the sections. The opposite side edge of section 34 is pivoted to one edge portion of section 36 by pivots 40 (Fig. 4). The opposite edge portion of section 36, in turn, is pivoted at 42 to a pair of supports 44 located at the ends of the cover section 36, as best illustrated in FIG. 4. Supports 44 are mounted on a housing 46 of the copier/duplicator 10.

Housing 46 has a recess 48 (FIGS. 2 and 5) which receives and stores the sections 32, 34 and 36 of the cover when the feeder is in its lowered position. The size of recess 48 is related to the dimensions of the cover sections so that when the cover sections are folded into the stored position illustrated in FIGS. 1 and 5 the upper surface of cover section 32 is substantially coplanar with adjacent portions of the housing of the copier/duplicator.

Figure 3:
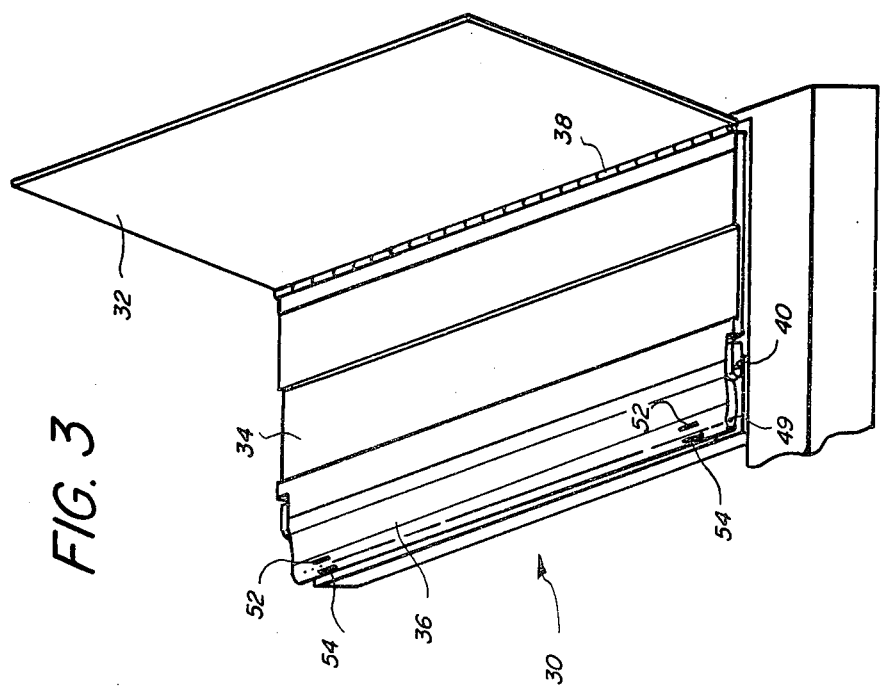
FIG. 3 is a fragmentary perspective view showing the cover partially opened.
Figure 5:
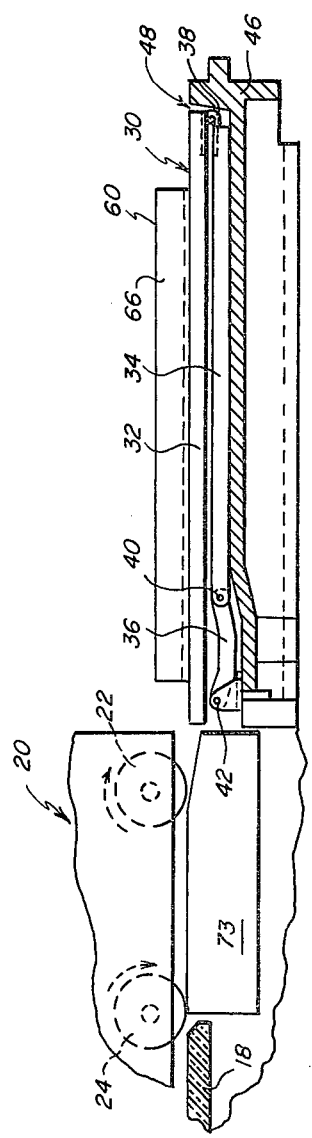
FIG. 5 is an enlarged section view taken along line 5—5 in FIG. 1 and showing a fragmentary portion of the feeder in its lowered position.

As best illustrated in FIGS. 2, 3 and 5, the width of cover section 32 is substantially equal to the sum of the widths of cover sections 34 and 36. Thus when the cover is in its storage position in recess 48, sections 34 and 36 are located beneath section 32 and section 32 substantially covers the sections 34 and 36.

Sections 32 and 34 are the same length and section 36 is only slightly smaller in length (in order to accommodate the structure for pivoting the section 36 to the housing and to section 34.) Thus when the cover sections are unfolded or extended to the platen-covering position illustrated in FIG. 2 they jointly form a substantially continuous surface that extends from recess 48 completely across platen 18 from one side to the other, and also from the front to the back of the platen. Thus the cover sections jointly are effective to shield the operator from any high intensity illumination from lamps 19 at the exposure station.

A handle 49 hinged on the upper surface of cover section 32 is used for moving the cover between its storage position and its extended position. When not in use, the handle is folded into a recess in the cover section so that it does not interfere with sheets moved across the cover into the feeder as explained later.

Usually a document placed on platen 18 and covered by the cover 30 is a relatively thin document, such as a sheet of paper. For such thin documents the cover sections 32, 34 and 36 are located in substantially edge-to-edge relationship as shown in FIG. 2 and in solid lines in FIG. 4. However, at times a relatively thick document, such as a book, is placed on the platen for copying, and such document also needs to be covered by the cover 30. In such cases the cover section 36 can be located in a generally vertical plane and cover section 34 can be located in a generally horizontal plane substantially perpendicular to section 36 as illustrated in dotted lines in FIG. 4. This allows the cover sections 32 and 34 to be substantially coplanar and directly over the book or other thick document to be copied.

Means preferably are provided for establishing an interlock that prevents operation of the copier/duplicator unless the document feeder 20 is in its lower position over the platen or, alternatively, the platen cover 30 is in position over the platen 18. Referring now to FIG. 4, an interlock for sensing the presence of the platen cover in its two positions over the platen comprises a detector 50 carried by housing 46 and located generally along a line extending between the two pivots 42 that mount the cover section 36 on supports 44. Detector 50 is adapted to sense members 52 and 54 on cover section 36 when one or the other of such members are located directly above the detector 50. Detector 50 can be of any suitable type, such as a magnetic detector, or it can comprise emittor-detector type apparatus.

Detector 50 is connected by conductors 56 to a logic and control unit (LCU) 58 that controls operation of the copier/duplicator. Thus the LCU is able to determine the presence of the cover in one of its two positions covering the platen and thereby enable operation of the copier/duplicator 10. While not illustrated in the drawings, a similar detector can be used to enable the operation of the copier/duplicator in response to sensing the presence of the feeder 20 in its lowered position. In this manner the copier/duplicator will operate only when the operator is shielded either by the feeder 20 or by the cover 30 from high intensity illumination present at the exposure station.

As best illustrated in FIGS. 1 and 2, a pair of sheet guide members 60 and 62 are mounted on section 32 of cover 30. Guide member 60 comprises a flat horizontal portion 64 and a vertical portion 66 located at the outer edge of the flat portion. Similarly, guide 62 has a flat portion 68 and a vertical portion 70 at one edge of the flat portion. Vertical portions 66 and 70 are at the outer most edges of the sheet guide members so that the sheet to be guided thereby can be placed face down on the flat portions 64, 68 with two opposite edges of the document sheet contacting the vertical portions 66 and 70.

Guide members 60, 62 are used for aligning a document sheet relative to the center line 72 (FIG. 1) of platen 18. Accordingly, vertical portion 66, 70 of the guide members are located equal distances from the line 72. When a sheet is properly aligned it can be manually delivered to the sheet drive means 22, 24 of feeder 20 across a smooth surface of a member 73 that extends between cover 30 and platen 18.

Sheet guide members 60, 62 need to be adjustable toward and away from the center line 72 of the platen in order to be able to locate and guide document sheets of various sizes into the feeder 20. In addition, it is desireable that the guide members 60, 62 be adjusted simultaneously and in a manner that will maintain the vertical portions 66, 70 of the guide members equally spaced from platen center line 72. Apparatus for simultaneously adjusting the guide members and for maintaining the desired relationship with center line 72 is illustrated in FIGS. 6 and 7 of the drawings.

As illustrated in FIGS. 6 and 7, cover section 32 has on its lower surface four spaced and generally parallel rails 74, 76, 78 and 80. A rack member 82 is located between rails 74, 76, and a similar rack member 84 is located between rails 78, 80. Rack member 82 has a row of gear teeth 86 along the side edge thereof nearest rail 76. Rack member 84 also has a row of teeth 88 extending along the side edge nearest rail 78. A gear 90 at the bottom surface of cover section 32 is between the rack members 82, 84 so that the teeth of gear 90 are engaged with the teeth 86, 88 of the rack members. Thus movement of either one of the rack members 82, 84 is transmitted by the teeth on that rack member through the gear 90 to the teeth on the other rack member to thereby provide simultaneous movement of the rack members in opposite directions. Gear 90 is held in place by a circular cover plate 92 and by a bolt 94.

In order to connect the racks 82, 84 to the sheet guide members 60, 62, elongate slots 96 and 98 are provided through cover section 32. The slots 96, 98 extend in a direction perpendicular to the center line 72 of the platen. Rack 82 is connected to sheet guide member 62 through slot 98 by fasteners 100 and, in a similar manner, rack member 84 is connected through slot 96 with sheet guide members 60. Thus when a machine operator desires to adjust the guides 60, 62 relative to each other, either one of the guides can be manually moved toward or away from center line 72. Such movement is transmitted through the rack members 82, 84 and gear 90 to effect corresponding adjustment of the other sheet guide member in the opposite direction.

The mechanism shown in FIGS. 6 and 7 for adjusting the sheet guide members is located directly over platen 18 when the auxiliary cover is in the position illustrated in FIG. 2. Accordingly, it is desireable to cover the entire lower surface of cover section 32 and the mechanism thereon with a sheet 102 that will hide the guide adjusting mechanism. Sheet 102 can be made of a white, reflective surface, for example. In a similar fashion the lower surface of cover section 34 can be covered with a similar material.

When the feeder 20 is in position over platen 18, cover 30 is in its folded position located in recess 48 of housing 46 adjacent to the platen 18. When a document sheet is to be inserted into the feeder for copying by using the drive means 22, 24, the sheet guide members 60, 62 are adjusted to the correct spacing for accommodating the document sheet. As previously explained, this is affected by the operator moving either of the guide members toward or away from the center line 72 of the platen to thereby affect a corresponding movement of the other guide member. Then the operator places the document sheet on cover section 32 between the vertical portions 66, 70 of the guide members, and manually moves the sheet to the left (as viewed in FIGS. 1, 2 and 5) across the surface of member 73 until the sheet reaches the nip defined by drive rollers 22 and the portion of the housing directly therebeneath. The feeder rollers then are effective to advance the sheet onto the platen 18 for copying.

When the feeder 20 is swung to its raised position as illustrated in FIG. 1 of the drawings, a document to be copied can be manually placed directly on the platen 18. Then the operator grasps handle 49 and swings cover 30 from its folded storage position illustrated in FIGS. 1 and 5 to its extended position over the platen and the document thereon as illustrated in FIG. 2 of the drawings. In the FIG. 2 position cover sections 32, 34 completely cover the platen 18 and any document located thereon and thereby shield the operator from exposure to high intensity illumination emmitted by the lamps 19 during exposure of a document on the platen. As noted earlier, section 36 of the cover can lie flat as shown in solid lines in FIG. 4 when a sheet of paper or similar thin document is being copied. On the other hand, section 36 of the cover can be moved to its raised position shown in phantom in FIG. 4 when thick documents, such as a book, are located on the platen for copying. In either position, sensor 50 provides a signal to the logic and control unit 58 of the copier/duplicator 10 to enable operation of a copier/duplicator only when the cover is in one of its two positions. As mentioned previously, a similar interlock can be provided so that the logic and control unit can determine when the feeder 20 is in its lowered position over the platen as illustrated in FIG. 5.

Thus the auxiliary platen cover of the present invention is operable, when feeder 20 is moved to its raised position and the cover moved to its extended position, to shield a machine operator (and any other person in the general area of the copier/duplicator) from high intensity illumination during the copying of either a flat, thin document or a relatively thick document. In addition, when the cover is in its storage position and the feeder is in its lowered position the sheet guides on the cover can be used to align sheets to be manually fed to the document feeder. The electrical interlock provided by the apparatus illustrated in FIG. 4 effectively prevents operation of the copier/duplicator when neither the feeder nor the cover are in position over the platen. Moreover, the auxiliary platen cover of the present invention is stored to one side edge of the platen instead of being mounted for folding movement from the back of the platen. Mounting of a platen cover to the rear of platen 18 would be quite difficult when a document feeder as shown at 20 in the drawings is present on the copier/duplicator. Thus the location of the auxiliary platen cover at the right side of the platen does not interfere with movement or operation of the document feeder 20.

The invention has been described in detail with particular reference to a preferred embodiment thereof, but it will be understood that variations and modifications can be effected within the spirit and scope of the invention.

We claim:

1. In a copier/duplicator having an exposure station, and a document feeder mounted for movement between (1) a first position over the exposure station for delivery to the station of a document sheet to be copied and (2) a second position spaced from the exposure station so that books or other documents can be manually placed on the exposure station, the improvement comprising:
   an auxiliary cover for the exposure station;
   means mounting the cover for movement between (1) a first position adjacent to the exposure station and the feeder when the feeder is in its first position and (2) a second position over the exposure station when the feeder is in its second position; and
   sheet guide means mounted on the cover, the guide means being located relative to the feeder when the feeder and cover are in their respective first positions to locate sheets for delivery to the feeder.

2. The invention as set forth in claim 1 wherein the feeder is mounted for movement about one side of the exposure station, the cover substantially covers the exposure station when the cover is in its second position, the cover comprises a plurality of sections connected to each other, and the mounting means pivotally connects one cover section to the copier/duplicator at another side of the exposure station opposite from the feeder.

3. The invention as set forth in claim 1 wherein the sheet guide means comprises a pair of guide members mounted for movement relative to each other along an upper surface of the cover so that sheets of different sizes can be guided to the feeder by the guide members.

4. In a copier/duplicator having an exposure station, a lamp for providing high-intensity illumination to a document at the exposure station, and a document feeder mounted at one side edge of the exposure station for movement between (1) a first position over the exposure station for delivery to the station of a document sheet to be copied and (2) a second position spaced from the station so that books or other documents can be manually placed on the station, the improvement comprising:
   an auxiliary cover for the exposure station, the cover being adapted to be located at (1) a first position adjacent to the exposure station and the feeder when the feeder is in its first position and (2) a second position over the exposure station when the feeder is in its second position, the cover being shaped and sufficiently large relative to the exposure station to afford protection from a substantial portion of the high-intensity illumination at the exposure station when the cover is in its second position;
   means pivotally mounting the cover on the copier/duplicator for movement between its first position and its second position; and
   a pair of sheet guide members mounted on the cover, the guide members being located relative to the feeder when the feeder and cover are in their respective first positions to align document sheets for manual delivery to the feeder, and the guide members being adjustable relative to each other to accommodate sheets of different sizes.

5. The invention as set forth in claim 4 wherein the cover comprises first, second and third sections hingedly connected to each other, the first section being folded over the second section when the cover is in its first position, and the third section being pivoted to the copier/duplicator at a side edge of the exposure station opposite from the one side edge thereof.

6. The invention as set forth in claim 5 wherein the first section of the cover is substantially the same size as the second and third sections combined and is effective to cover both such sections when the cover is in its first position, and when the cover is in its second position (1) the second section is approximately coplanar with the first section and (2) the third section is either (i) approximately coplanar with the second section when a thin document, such as a sheet of paper is at the exposure station, or (ii) substantially perpendicular to the second section when a thick document, such as a book, is at the exposure station.

7. The invention as set forth in claim 5 further comprising means for sensing the presence of the cover in its second position, and means for enabling the copier/duplicator in response to the sensing means detecting the presence of the cover in its second position.

* * * * *